United States Patent
Serbutoviez et al.

(10) Patent No.: US 6,306,469 B1
(45) Date of Patent: *Oct. 23, 2001

(54) POLYMER DISPERSED LIQUID CRYSTAL CELL

(75) Inventors: Christoph Serbutoviez, Voiron (FR); Johan G. Kloosterboer; Fredericus J. Touwslager, both of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,546

(22) Filed: Jan. 26, 1998

(30) Foreign Application Priority Data

Jan. 28, 1997 (EP) .................................................. 97200218

(51) Int. Cl.$^7$ ..................................................... C09K 19/52
(52) U.S. Cl. ................. 428/1.1; 349/86; 349/88; 349/92; 349/93; 349/187
(58) Field of Search .................. 349/187, 86, 88, 349/92, 93; 428/1.1

(56) References Cited

U.S. PATENT DOCUMENTS

| | | | |
|---|---|---|---|
| 5,270,843 | * | 12/1993 | Wang ..................................... 359/52 |
| 5,523,127 | * | 6/1996 | Ohnishi ................................. 428/1.1 |
| 5,867,238 | * | 2/1999 | Miller ..................................... 349/92 |

FOREIGN PATENT DOCUMENTS

0575791A1     12/1993  (EP) .

* cited by examiner

*Primary Examiner*—Nasser Ahmad
(74) *Attorney, Agent, or Firm*—Aaron Waxler

(57) ABSTRACT

The invention provides a method of filling a PDLC cell, a polymerizable mixture suitable for this purpose as well as a display device provided with such a PDLC cell. The mixture in accordance with the invention comprises two types of non-volatile reactive monomers, the first type of monomer being readily miscible with liquid crystalline material and the second type of monomer being poorly miscible with the liquid crystalline material. Such mixtures prove to be very stable. In addition, when such mixtures are used in cells, problems regarding compositional drift do not occur. Cells in which the inventive mixture is used demonstrate a relatively low hysteresis as well as a relatively low switching voltage. By virtue thereof, it is very attractive to use these cells in a display device.

4 Claims, 3 Drawing Sheets

POLYMER DISPERSED LIQUID CRYSTAL CELL

BACKGROUND OF THE INVENTION

The invention relates to a method of manufacturing a polymer-dispersed liquid crystal cell, in which method a mixture, which predominantly comprises a liquid crystalline material as well as reactive monomers and a photoinitiator, is sandwiched between two substrates, which are provided with an electrode layer, whereafter the mixture is polymerized under the influence of radiation. The invention also relates to a polymerizable mixture which can suitably be used in a polymer-dispersed liquid crystal cell as well as on a display device comprising such a cell.

Polymer-dispersed liquid crystal cells (abbr. PDLC cells) are increasingly being used in electro-optic devices, such as display devices, optical projectors and electrically drivable optical shutters. The optically active material of these cells is formed by liquid crystalline material which is dispersed in a matrix of a polymerized material. Such a material is referred to as a polymer-dispersed liquid crystalline material (abbr. PDLC material). This material is customarily prepared by providing a mixture of a liquid crystalline material (70–95% by weight), reactive monomers (5–30% by weight) and at least one photoinitiator, in the form of a layer, between two substrates of a cell and, subsequently, polymerizing this layer under the influence of radiation. During polymerization, phase-separation occurs, which leads to the formation of the desired optically active layer of polymer-dispersed liquid crystalline material. This layer can be switched between an optically transparent state (in the presence of a field) and an optically scattering or translucent state (in the absence of a field) by means of an electric field.

A method of the type mentioned in the opening paragraph is known per se, for example, from European Patent publication EP-A 575.791. More particularly, in examples 5–18 of said publication, a description is given of a prepolymer of reactive monomers composed of 2-ethylhexylacrylate (EHA) as well as one or two polyfunctional monomers. One part by weight of this prepolymer is mixed with four parts by weight of a non-reactive liquid crystalline material. Also a small quantity of a photoinitiator is added to this mixture. The resultant polymerizable mixture is subsequently provided between two substrates and polymerized by means of UV light so as to form an optically active layer.

The known method has an important drawback. It has been found that the electro-optical response of the PDLC cells thus manufactured is not uniform at all parts of the surface of the cell. For example, the switching voltage necessary to switch from transparent to scattering, and vice versa, is found to be different for different parts made of PDLC material. It has further been found that the electro-optical properties of the PDLC material are insufficiently stable with respect to time. Life tests show that these properties deteriorate relatively rapidly. For example, the hysteresis and the switching voltage increase rapidly.

OBJECTS AND SUMMARY OF THE INVENTION

It is an object of the invention to overcome the above-mentioned disadvantage. The invention more particularly aims at providing a method of manufacturing PDLC cells which exhibit a uniform electro-optical response, which is stable with respect to time. The PDLC cells manufactured by means of the inventive method should have a relatively low switching voltage, preferably, of approximately 6 V or less as well as a relatively low hysteresis, preferably, of approximately 3% or less. Another object of the invention is to provide a polymerizable mixture which is stable with respect to time and which can suitably be used in the method in accordance with the invention. The invention should also provide a display device having an improved PDLC cell.

These and other objects of the invention are achieved by a method of the type mentioned in the opening paragraph, which is characterized, in accordance with the invention, in that the mixture comprises two types of non-volatile, reactive monomers, the first type of monomer being readily miscible with the liquid crystalline material and the second type of monomer being poorly miscible with said liquid crystalline material.

The invention is based on the insight that in the case of the known cells a non-uniform electro-optical response is obtained because the composition of the PDLC material is not the same everywhere. This is attributed to the presence of EHA in the known polymerizable mixture. This compound has a relatively great volatility. During filling of the cell, this compound evaporates, which leads to concentration differences in the filled cell. This results in a non-uniform electro-optical response in the known cell. EHA exhibits the greatest volatility problems if the cells are filled under the influence of a reduced pressure.

It has been found that the problem cannot be solved by simply replacing the volatile EHA with a single, non-volatile acrylate compound having approximately the same molecular mass. The replacement of EHA of the known polymerizable mixture by a non-volatile, higher alkylacrylate, such as decylacrylate (DA) yields poor results. Various electro-optical properties, such as the switching voltages and the hysteresis of the switching curve, of a cell comprising such a polymerized mixture turn out to be considerably worse than those of the known cell comprising the EHA-containing mixture. It is noted that the term "non-volatile monomers" is to be understood to mean monomers whose vapor pressure is smaller than 1 Pa.

The invention is further based on the experimentally gained insight that the mixing properties of the non-volatile monomers to be polymerized, which contain the liquid-crystalline material, play an important role in the electro-optical properties of the ultimate PDLC cell. It has been found that a part of these monomers should be readily miscible with the liquid-crystalline material, whereas another part of these monomers should be poorly miscible with said liquid-crystalline material. Mixtures comprising these two types of non-volatile, reactive monomers can be used very successful in PDLC cells. The electro-optical properties of these cells range from good to very good.

A preferred embodiment of the method in accordance with the invention is characterized in that the first type of monomer is an ethoxylated alkyl-phenolacrylate whose alkyl group comprises at least five C-atoms, and in that the second type of monomer is an alkylacrylate whose alkyl group comprises at least 8 and maximally 18 C-atoms.

In experiments it has been established that ethoxylated alkyl-phenolacrylates of the above-mentioned type are very readily miscible with customary liquid crystalline material, provided that the number of C-atoms of the alkyl group is greater than four. It has also been found that alkylacrylates of the above-mentioned type are poorly, i.e. incompletely, miscible with customary liquid crystalline materials, provided that the alkyl group comprises at least 8 and maximally 18 C-atoms. If alkyl groups comprising fewer than 8 C atoms are used, then the alkylacrylate becomes too volatile. If alkyl groups comprising more than 18 C-atoms are used, the degree of miscibility of the alkylacrylate with the liquid crystalline material becomes too high.

A further preferred embodiment of the method in accordance with the invention is characterized in that the quantity of each of the two types of monomers is at least 20% by weight, calculated with respect to the overall quantity of both types of monomers. If the quantity of one of the two types of reactive monomers is smaller than 20% by weight, then the switching voltage and the hysteresis of the cell manufactured with said monomers is relatively high. Preferably, the ratio between both types of monomers is approximately 1:2. In this case, the lowest values as regards switching voltage and hysteresis of the PDLC cell are achieved.

An interesting embodiment of the method in accordance with the invention, is characterized in that the mixture is introduced into the cell by means of a reduced pressure. In experiments it has been established that PDLC cells manufactured in accordance with this embodiment of the invention exhibit very stable electro-optical properties.

The invention also relates to a polymerizable mixture which can suitably be used in a polymer-dispersed liquid crystal cell, and which comprises reactive monomers and a photoinitiator. In accordance with the invention, this mixture comprises two types of non-volatile, reactive monomers, the first type of monomer being readily miscible with liquid crystalline material and the second type of monomer being poorly miscible with liquid crystalline material. PDLC cells comprising this mixture exhibit good electro-optical properties, such as, in particular, a uniform electro-optical response.

A preferred embodiment of the polymerizable mixture is characterized in that the first type of monomer is an ethoxylated alkyl-phenolacrylate whose alkyl group comprises at least five C-atoms, and in that the second type of monomer is an alkylacrylate whose alkyl group comprises at least 8 and maximally 18 C-atoms. In this connection, good results have been achieved with a mixture in which the quantity of each of the two types of monomers is at least 20% by weight, calculated with respect to the overall quantity of both types of monomers. Preferably, the ratio between both types of monomers is approximately 1:2. The polymerizable mixture is optimally suitable for use in a PDLC cell if 70–90% by weight of a liquid crystalline material of a customary type has been added. The polymerizable mixture thus obtained can be directly used to fill PDLC cells.

The invention also relates to a display device comprising a polymer-dispersed liquid crystal cell. In this case, the electrode layers of the substrates of the cell are constructed so as to form rows and columns, each row or column being individually drivable. The rows of one substrate and the columns of the other substrate are oriented so as to extend at right angles to each other. The presence of the matrix of electrodes formed by said columns and rows enables pixels of the PDLC material of the display device to be driven locally by means of an electric voltage. Preferably, each one of the pixels is provided with a solid-state switch in the form of a thin-film transistor or a thin-film diode. By virtue thereof, it becomes possible to form images. The PDLC cells manufactured in accordance with the inventive method can very suitably be used in such a display device.

These and other aspects of the invention will be apparent from and elucidated with reference to the embodiments described hereinafter.

It is noted that, for clarity, the Figures may not be drawn to scale.

DESCRIPTION OF THE PREFERRED EMBODIMENTS

Figure 1:
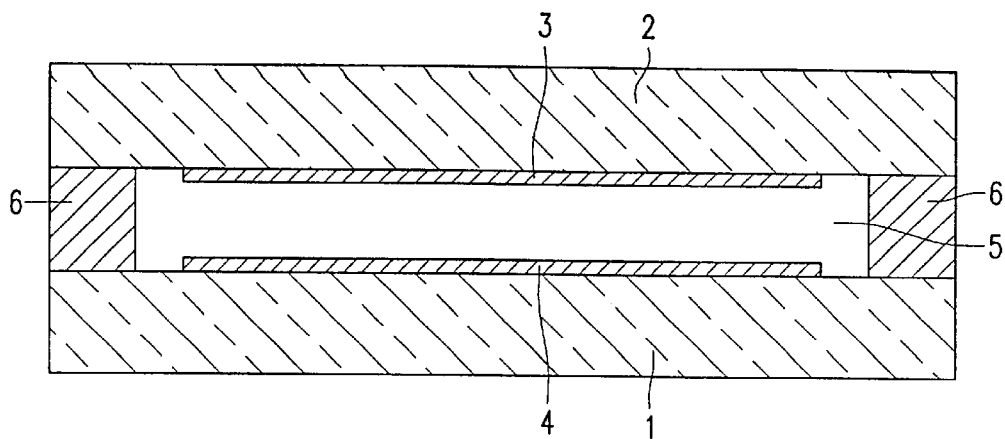
FIG. 1 is a schematic, sectional view of a PDLC cell.

FIG. 1 is a schematic, sectional view of a cell which can be used in the manufacture of a PDLC cell in accordance with the invention. This cell comprises two predominantly parallel substrates (1,2) which are provided with an electrode layer (3,4) on the surfaces facing each other. An optically active layer (5) of a polymerized PDLC material is situated in the space between the electrode layers. The distance between the electrode layers ranges between 4 micrometers and 20 micrometers, preferably between 5 and 10 micrometers. This distance is maintained by the presence of spacers (not shown) in the optically active layer, for example in the form of small balls or fibers of glass. The space between the electrode layers is closed by means of a seal (6), for example in the form of a seal line.

At least one of the electrode layers is made of a transparent, electroconductive material, such as indium-tin oxide (ITO). In order to be suitable for use in a display device operating in the reflection mode, at least one of the substrates of the cell is transparent to the light used. In order to be suitable for use in a display device operating in the transmission mode, both substrates and both electrode layers of the cell have to be transparent.

The PDLC cell shown in FIG. 1 was manufactured as follows. Two transparent substrates, for example of glass, which are provided on a main surface with an electrode layer of ITO are positioned substantially parallel to each other by means of spacer balls (7 micrometers across), said electrode layers facing each other. Subsequently, the side faces of the space thus formed are sealed by means of a seal line, in such a manner that one or two filling holes are preserved.

The cell can be filled in two different ways, i.e. at a reduced pressure or by means of capillary action. If the cell is filled at a reduced pressure, said cell is evacuated by means of one or more filling holes and, subsequently, arranged in the PDLC material to be polymerized. Subsequently, the vacuum in the cell is removed. The reduced pressure in the cell, which is created in the above-described manner, is used to fill the cell space with the PDLC material to be polymerized. By contrast, if a cell is filled using capillarity, it is filled by capillary action instead of a reduction in pressure. If the cell is filled by capillary action, it should comprise at least two filling holes, which must be provided in two oppositely arranged parts of the cell.

After the filling holes have been closed, the PDLC mixture is polymerized by subjecting it to radiation with UV light (300–400 nm; 7 mW/cm$^2$) at a temperature of 30° C. for approximately 5 minutes. During said polymerization process, a phase separation between the liquid crystalline material and the polymer being formed takes place. The intended polymer-dispersed liquid crystalline phase is obtained by polymerizing.

Figure 2:
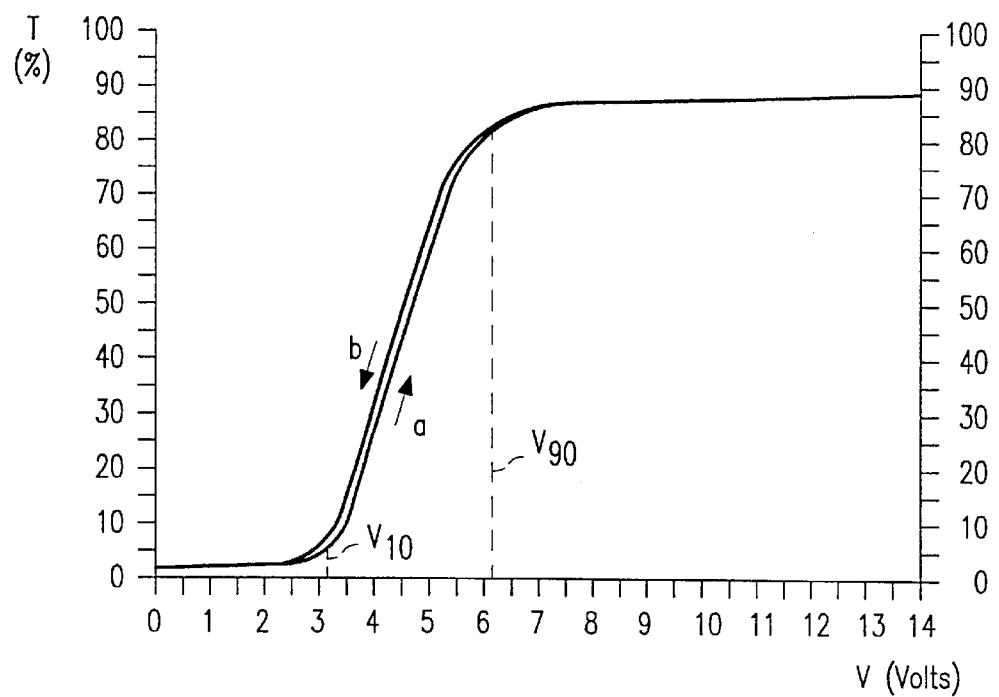
FIG. 2 shows the electro-optical curve of a PDLC cell.

FIG. 2 shows an example of an electro-optical curve of a PDLC cell. In this curve, the transmission T (%) is plotted as a function of the electric voltage V (volt) which is applied across the PDLC layer of the cell by means of the ITO electrodes. The arrows (a) and (b) of FIG. 2 show the trend of the curve if the voltage increases and decreases, respectively. The V10 and V90-values are also indicated in the curve. The V10 value of the curve is the voltage at which the transmission of the ascending curve amounts to 10% of the transmission which can be maximally achieved with the cell. The V90 value of the curve is the voltage at which the transmission of the ascending curve is 90% of the transmission which can be maximally achieved with the cell. The hysteresis of the curve is determined at 50% of the maximum transmission. Said hysteresis is indicated as the difference (mV) between the ascending and the descending curve. This value multiplied by hundred and divided by the average value of the ascending and the descending curve at 50% transmission is indicated as the percentage (%) of hysteresis.

Comparative Experiment

Figure 3:
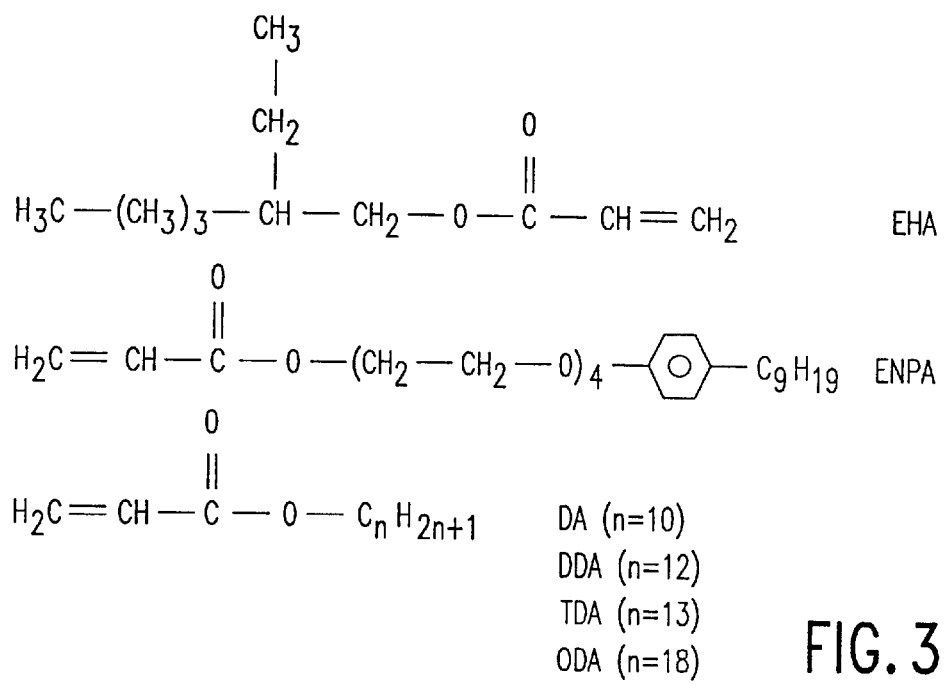
FIG. 3 shows a number of structural formulas of chemical compounds.

In a first series of experiments, a number of PDLC cells were manufactured, using a polymerizable mixture in accordance with the state of the art. The mixture used was composed of 20% by weight of PN393 (Merck) and 80% by weight of a non-reactive liquid crystalline material of the type TL205 (Merck). This comprises a mixture of a non-reactive, low-molecular liquid crystalline material. PN393 predominantly comprises the reactive monomer EHA, the structural formula of which is shown in FIG. 3. It also comprises a few monomers and oligomers containing two or more reactive groups. These compounds serve as a cross-linking agent in the polymeric material to be prepared. PN393 also comprises two photoinitiators (Darocur 1173 and Lucirine TPO) to polymerize the reactive groups. In a first series of cells, the mixture was introduced into the PDLC cells by means of capillary action, and in a second series of cells the mixture was introduced via vacuum-filling, whereafter the mixture was polymerized under the above-mentioned conditions.

Visual inspection revealed that the cells which were filled at a reduced pressure exhibited clearly visible ring-shaped structures around the filling hole. Closer inspection also revealed that these cells demonstrated a poor electro-optical response. For example, it was found that the voltage necessary to switch from transparent to scattering, and conversely, was dependent on the location and hence not the same throughout the surface of the optically active layer of the cell. This phenomenon is ascribed to the so-called "compositional drift", which can occur as a result of evaporation of EHA during filling of the cell. When the cell is filled by means of capillary action, said evaporation occurs to a lesser degree. The cells of the second series also exhibited ring-shaped structures around the filling hole. However, these structures were less clearly visible than those of the vacuum-filled cells.

Experiments in Accordance with the Invention

In a subsequent experiment, the EHA of the polymerizable mixture PN393 was replaced by a mixture of 37.5 parts by weight of ethoxylated nonyl-phenolacrylate (ENPA, see FIG. 3) and 62.5 parts by weight of tridecylacrylate (TDA, see FIG. 3). This mixture is referred to as PN393'. A quantity of 20 parts by weight of this polymerizable mixture were mixed with 80 parts by weight of the liquid crystalline material TL205 (Merck). In a first series of cells, the mixture thus obtained was introduced into the PDLC cells via capillary-filling, and, in a second series, via vacuum-filling, whereafter said mixture was polymerized under the above-mentioned conditions.

Visual inspection of the PDLC cells manufactured in accordance with the invention revealed that there were no ring-shaped structures around the filling opening. In the case of both the vacuum-filled cells and the capillary-filled cells, said ring-shaped structures were absent.

Table 1 lists seven different PDLC cells, which are filled, either via vacuum-filling or capillary action, with one of the two above-described mixtures, i.e. of PN393 or PN393'. To determine the stability of the mixtures, a number of the cells were subjected to an accelerated life test after the polymerization process ("aftertreatment"). Table 2 lists some electro-optical properties of these cells, i.e. the value of the switching voltages V10 and V90 as well as the hysteresis (%). These properties were measured immediately after the manufacture of the cells (cells 1, 3 and 5) or after the cells had been subjected to life tests (cells 2, 4, 6 and 7).

TABLE 1

| Cell | Mixture | Filling method | Aftertreatment |
|---|---|---|---|
| 1. | PN393/TL205 | Capillary | — |
| 2. | PN393/TL205 | Capillary | 5 min, 90° C. |
| 3. | PN393'/TL205 | Capillary | — |
| 4. | PN393'/TL205 | Capillary | 60 min, 90° C. |
| 5. | PN393'/TL205 | Vacuum | — |
| 6. | PN393'/TL205 | Vacuum | 60 min, 100° C. |
| 7. | PN393'/TL205 | Vacuum | 960 min, 100° C. |

TABLE 2

| Cell | 1 | 2 | 3 | 4 | 5 | 6 | 7 |
|---|---|---|---|---|---|---|---|
| V10 (mV) | 5.0 | 5.7 | 3.3 | 3.6 | 3.1. | 3.2. | 3.2 |
| V90 (mV) | 8.8 | 10.6 | 6.0 | 6.4 | 5.9 | 6.0 | 6.1 |
| hysteresis(%) | 3.0 | 7.1 | 2.6 | 4.4 | 2.9 | 2.9 | 2.8 |

The Tables show that the cells comprising the polymerized mixtures in accordance with the invention exhibit a substantially lower V90 value as well as a substantially higher stability than cells comprising the known mixture. A comparison between the cells 1 and 2 (not in accordance with the invention) shows that after a life test of 5 minutes at 90° C. the hysteresis of the known mixture has already more than doubled.

The hysteresis of cells comprising the mixtures in accordance with the invention increases less than the hysteresis of cells comprising the known mixture. The hysteresis of the mixture in accordance with the invention remains substantially constant if it has been introduced into the PDLC cell via vacuum-filling. Cells which are filled in this manner also demonstrate the lowest hysteresis and the greatest stability.

A comparison of the cells 1 and 2 shows that the V10 and V90 values of the known material increase substantially after a short treatment at an elevated temperature. The cells filled by means of the method in accordance with the invention prove to be much more stable in this respect. The stablest cells are those which are vacuum-filled with the mixture in accordance with the invention.

In a number of further experiments, the ratio in which the two non-volatile reactive monomers occur in the polymerizable mixture was varied. In this case, the two non-volatile reactive monomers include the above-mentioned ENPA with one of the following alkylacrylates: decylacrylate (DA), dodecylacrylate (DDA), tridecylacrylate (TDA) or octodecylacrylate (ODA). The chemical structural formulas of these compounds are shown in FIG. 3. ENPA is a monomer which is very readily miscible with customary liquid crystalline materials, such as PN393. The above-mentioned alkylacrylates, however, are poorly (i.e. incompletely) miscible with customary liquid crystalline materials.

A quantity of 80 parts by weight of TL205 (Merck) were added to 20 parts by weight of the polymerizable mixtures comprising one of the above-mentioned combinations of non-volatile monomers. The mixtures thus formed were introduced into PDLC cells at a reduced pressure. After polymerization of the mixture under the above-mentioned conditions, the hysteresis as well as the V90 or the V50 value of the cells were determined. The measured values are indicated in the graphs of FIG. 4.

Figure 4A:
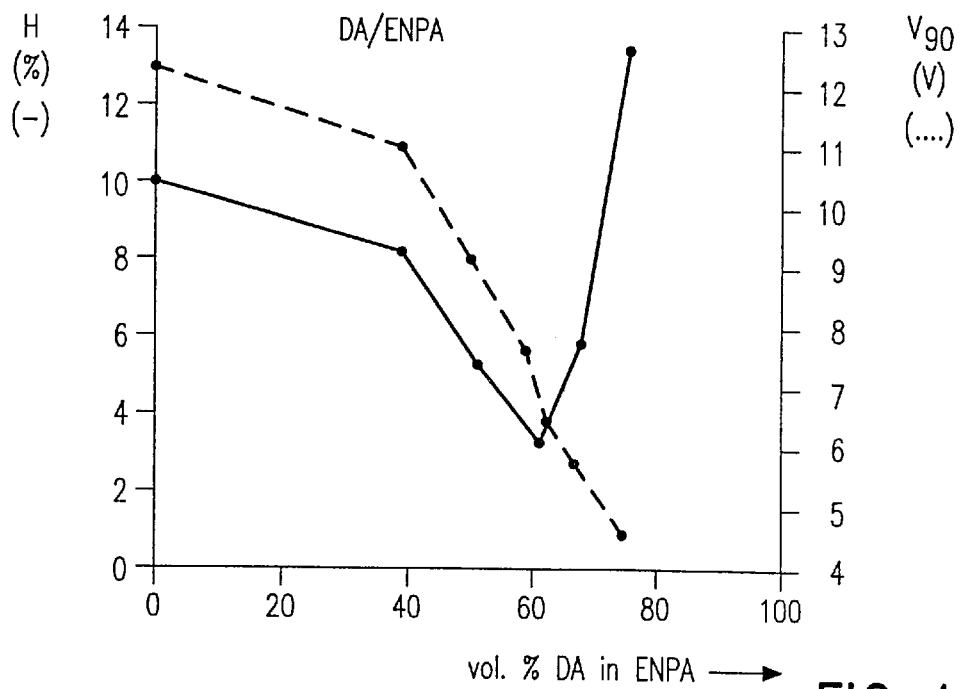
FIG. 4 shows graphs in which the hysteresis and the V90 or the V50-values of a few mixtures of non-volatile monomers are plotted as a function of their mixing ratio.
Figure 4B:
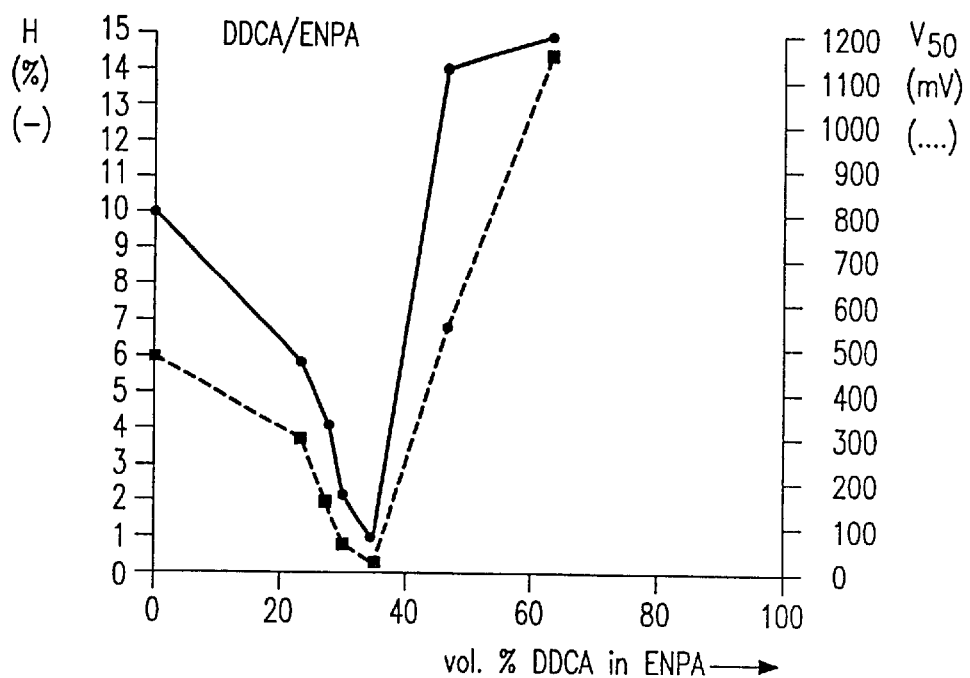
Figure 4C:
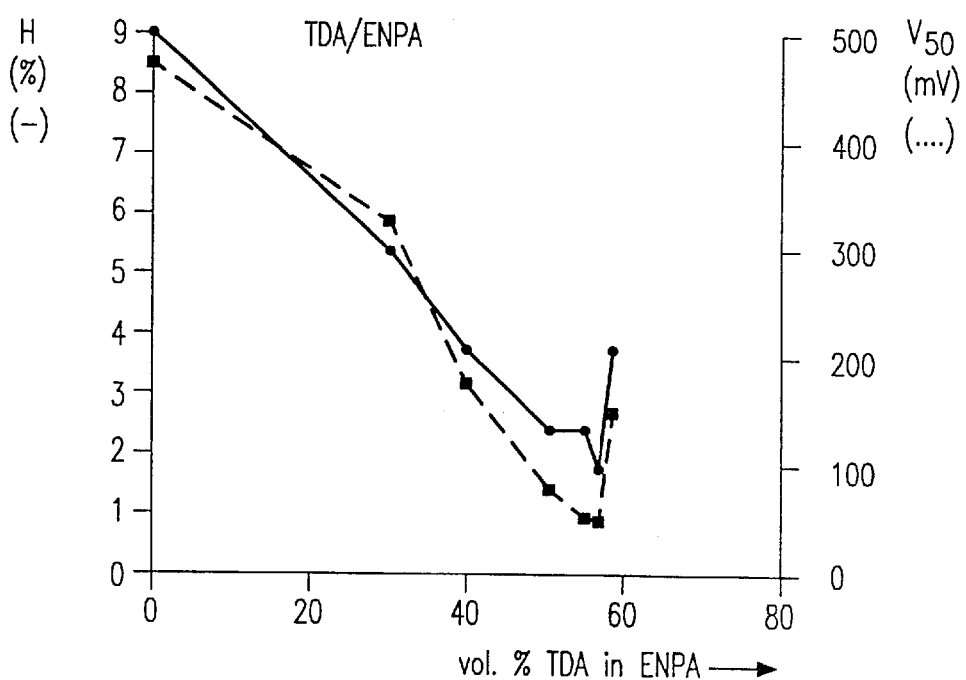

FIGS. 4A–C show that the lowest values for the hysteresis and for V90 or V50 are obtained with mixtures comprising at least 20% by weight of one of the two non-volatile reactive monomers. If use is made of mixtures comprising less than 20% by volume of one of the two monofunctional monomers, either the hysteresis or the V90 or V50 values demonstrate an unacceptably large increase. The lowest values are achieved at mixing ratios of the non-volatile monomers of approximately 1:2.

The invention provides a method of filling a PDLC cell, a polymerizable mixture suitable for this purpose as well as a display device provided with such a PDLC cell. The mixture in accordance with the invention comprises two types of non-volatile reactive monomers, the first type of monomer being readily miscible with liquid crystalline material and the second type of monomer being poorly miscible with the liquid crystalline material. Such mixtures prove to be very stable. In addition, when such mixtures are used in cells, problems regarding compositional drift do not occur. Cells in which the inventive mixture is used demonstrate a relatively low hysteresis as well as a relatively low switching voltage. By virtue thereof, it is very attractive to use these cells in a display device.

What is claimed is:

1. A method of manufacturing a polymer-dispersed liquid crystal cell, in which method a mixture, which predominantly comprises a non-reactive liquid crystalline material as well as reactive monomers and a photoinitiator, comprising:

sandwiching the mixture between two substrates, which are provided with an electrode layer, and polymerizing the mixture under the influence of radiation, characterized in that the mixture comprises first and second types of non-volatile, reactive monomers, the first type of monomer being readily miscible with the liquid crystalline material and the second type of monomer being poorly miscible with said liquid crystalline material, and wherein the second type of monomer is an alkyl acrylate whose alkyl group comprises at least 8 and maximally 18 C-atoms.

2. A method as claimed in claim 1, characterized in that the first type of monomer is an ethoxylated alkylphenolacrylate whose alkyl group comprises at least five C-atoms.

3. A method as claimed in claim 1, characterized in that the quantity of each of the first and second types of monomers is at least 20% by weight, calculated with respect to the overall quantity of both types of monomers.

4. A method as claimed in claim 1, characterized in that the mixture is introduced into the cell under the influence of a reduced pressure.

* * * * *